US012755543B2

(12) United States Patent
Root et al.

(10) Patent No.: US 12,755,543 B2
(45) **Date of Patent: *Oct. 6, 2026**

(54) SYSTEMS AND METHODS FOR OBJECT DETECTION IN AN ENVIRONMENT

(71) Applicant: Sensormatic Electronics, LLC, Boca Raton, FL (US)

(72) Inventors: Cory Olog Root, Delray Beach, FL (US); Natasha M. Astudillo, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 290 days.

This patent is subject to a terminal disclaimer.

(21) Appl. No.: 18/575,542

(22) PCT Filed: Jul. 1, 2022

(86) PCT No.: PCT/US2022/073338

§ 371 (c)(1),
(2) Date: Dec. 29, 2023

(87) PCT Pub. No.: WO2023/279077

PCT Pub. Date: Jan. 5, 2023

(65) Prior Publication Data

US 2024/0312213 A1 Sep. 19, 2024

Related U.S. Application Data

(60) Provisional application No. 63/217,483, filed on Jul. 1, 2021.

(51) Int. Cl.
*G06V 40/10* (2022.01)
*G06V 20/52* (2022.01)

(52) U.S. Cl.
CPC .............. *G06V 20/52* (2022.01); *G06V 40/10* (2022.01)

(58) Field of Classification Search
CPC ................................ G06V 20/52; G06V 40/10
See application file for complete search history.

(56) References Cited

U.S. PATENT DOCUMENTS 9,946,936 B2 * 4/2018 Mizes ................. G06F 18/2411
11,941,895 B1 * 3/2024 Walsh .................... G06N 20/00
(Continued)

OTHER PUBLICATIONS

Sangoboye Fisayo Caleb et al: "PLCount : A Probabilistic Fusion Algorithm for Accurately Estimating Occupancy from 3D Camera Counts", Proceedings of the 3rd ACM International Conference on Systems for Energy-Efficient Built Environments, New York, USA, [Online], Nov. 16, 2016, pp. 147-156.
(Continued)

*Primary Examiner* — Shaghayegh Azima
(74) *Attorney, Agent, or Firm* — ArentFox Schiff LLP

(57) ABSTRACT

Disclosed herein are apparatuses and methods for object detection in an environment. An implementation may comprise detecting, using at least one sensor, persons that entered and exited the environment during a first period of time and determining an entry count and an exit count accordingly. The implementation may comprise retrieving, from a database, historical ingress and egress data comprising entry and exit counts of the environment for a second period of time. The implementation may comprise determining an amount of expected exit counts for the first period of time based on the historical ingress and egress data of the second period of time by fitting the historical ingress and egress data to a first probability distribution. The implementation may comprise updating the exit count for the first period of time to the amount of expected exit counts and storing the updated exit count in the database.

18 Claims, 5 Drawing Sheets

(56) References Cited

U.S. PATENT DOCUMENTS

| | | | | |
|---|---|---|---|---|
| 12,118,796 | B2 * | 10/2024 | Stewart | G06V 20/53 |
| 12,515,604 | B2 * | 1/2026 | de Almeida | B60R 19/40 |
| 2010/0225764 | A1 * | 9/2010 | Nizko | G01S 13/04<br>348/152 |
| 2015/0161545 | A1 * | 6/2015 | Willemain | G06Q 10/06315<br>705/7.25 |
| 2016/0217384 | A1 * | 7/2016 | Leonard | G06N 5/022 |
| 2018/0011463 | A1 * | 1/2018 | Chowdhury | G06Q 10/10 |
| 2019/0260688 | A1 * | 8/2019 | Anand | G06F 17/18 |
| 2020/0273538 | A1 * | 8/2020 | Barbacioru | C12Q 1/6886 |
| 2020/0380252 | A1 * | 12/2020 | Ding | G06Q 30/0609 |
| 2021/0284486 | A1 * | 9/2021 | Singaraju | B66B 1/28 |
| 2021/0374426 | A1 * | 12/2021 | Park | G06V 40/172 |
| 2022/0067391 | A1 * | 3/2022 | Chang | G06V 40/50 |
| 2022/0083767 | A1 * | 3/2022 | Subramanian | G06Q 10/087 |
| 2022/0253425 | A1 * | 8/2022 | Budalakoti | G06N 5/04 |
| 2023/0227287 | A1 * | 7/2023 | Takada | B66B 3/00<br>187/380 |

OTHER PUBLICATIONS

Sangogboye Fisayo Caleb et al: “PreCount: a predictive model for correcting real-time occupancy count data”, Energy Informatics, [Online] vol. 1, No. 1, Aug. 23, 2018.

Jamie Halliday et al.: “PoARX Modelling for Multivariate Count Time Series”, arxiv.org, Cornell University Library, 201 Olin Library Cornell University Ithaca, NY 14853, Jun. 13, 2018, Section 1.

International Search Report and Written Opinion issued in International Patent Application No. PCT/US2022/073338 on Nov. 15, 2022.

* cited by examiner

SYSTEMS AND METHODS FOR OBJECT DETECTION IN AN ENVIRONMENT

CROSS-REFERENCE TO RELATED APPLICATIONS

This application is a 35 U.S.C. § 371 National Phase of PCT Application No. PCT/US2022/073338, filed on Jul. 1, 2022, which claims the benefit of U.S. Provisional Application No. 63/217,483, filed Jul. 1, 2021, the disclosures of which are hereby incorporated by reference herein in their entireties.

TECHNICAL FIELD

The described aspects relate to security systems that comprise object detection features.

BACKGROUND

Aspects of the present disclosure relate generally to vision systems that may be used for security, and more particularly to object detection.

Vision systems may be used to detect objects in an environment. In some implementations, for example, vision systems may include object detection and counting capabilities. For instance, in some cases, the object may be a person, and the object counting may be used for determining occupancy counts, which is important for fields such as security, marketing, and health. For example, a user of a security system may be interested in knowing how many people have entered/exited a theater with a fire code occupancy limit. An owner of a shopping mall may be interested in knowing how many people enter different stores to evaluate popularity. Office personnel may be interested in knowing how many people have entered an office to enforce health-based regulations (e.g., limit the occupancy count to prevent the spread of a virus).

Conventional systems, however, often fail to provide accurate detection and/or counts due to sub-par detection algorithms, aging/corrupted hardware, and different exit/entry scenarios (e.g., visual/physical obstacles, unorthodox entry/exit movement by people, etc.). Accordingly, there exists a need for improvements in such vision systems with objection detection/counting capabilities.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method for use by a vision system for detecting objects in an environment, comprising detecting, using at least one sensor, persons that entered and exited the environment during a first period of time. The method further includes determining an entry count and an exit count for the first period of time. The method further includes retrieving, from a database, historical ingress and egress data comprising entry and exit counts of the environment for a second period of time. The method further includes determining an amount of expected exit counts for the first period of time based on the historical ingress and egress data of the second period of time by fitting the historical ingress and egress data to a first probability distribution. The method further includes updating the exit count for the first period of time to the amount of expected exit counts. The method further includes storing the updated exit count in the database.

Another example implementation includes a vision system for detecting objects in an environment, comprising a memory and a processor in communication with the memory. The processor is configured to detect, using at least one sensor, persons that entered and exited the environment during a first period of time. The processor is configured to determine an entry count and an exit count for the first period of time. The processor is configured to retrieve, from a database, historical ingress and egress data comprising entry and exit counts of the environment for a second period of time. The processor is configured to determine an amount of expected exit counts for the first period of time based on the historical ingress and egress data of the second period of time by fitting the historical ingress and egress data to a first probability distribution. The processor is configured to update the exit count for the first period of time to the amount of expected exit counts and store the updated exit count in the database Another example implementation includes a vision system for detecting objects in an environment, comprising means for detecting, using at least one sensor, persons that entered and exited the environment during a first period of time. The apparatus further includes means for determining an entry count and an exit count for the first period of time. The apparatus further includes means for retrieving, from a database, historical ingress and egress data comprising entry and exit counts of the environment for a second period of time. The apparatus further includes means for determining an amount of expected exit counts for the first period of time based on the historical ingress and egress data of the second period of time by fitting the historical ingress and egress data to a first probability distribution. The apparatus further includes means for updating the exit count for the first period of time to the amount of expected exit counts, and storing the updated exit count in the database.

Another example implementation includes a computer-readable medium storing instructions, for use by a vision system for detecting objects in an environment, executable by a processor to detect, using the at least one sensor, persons that entered and exited the environment during a first period of time. The instructions are further executable to determine an entry count and an exit count for the first period of time. The instructions are further executable to retrieve, from a database, historical ingress and egress data comprising entry and exit counts of the environment for a second period of time. The instructions are further executable to determine an amount of expected exit counts for the first period of time based on the historical ingress and egress data of the second period of time by fitting the historical ingress and egress data to a first probability distribution. The instructions are further executable to update the exit count for the first period of time to the amount of expected exit counts and store the updated exit count in the database.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure describes implementations of improving vision systems that include occupancy counting features. Vision systems often fail to provide accurate counts of objects due to object detection issues. To address these shortcomings, the present disclosure describes how to improve occupancy counts using historical object detection data.

Figure 1:
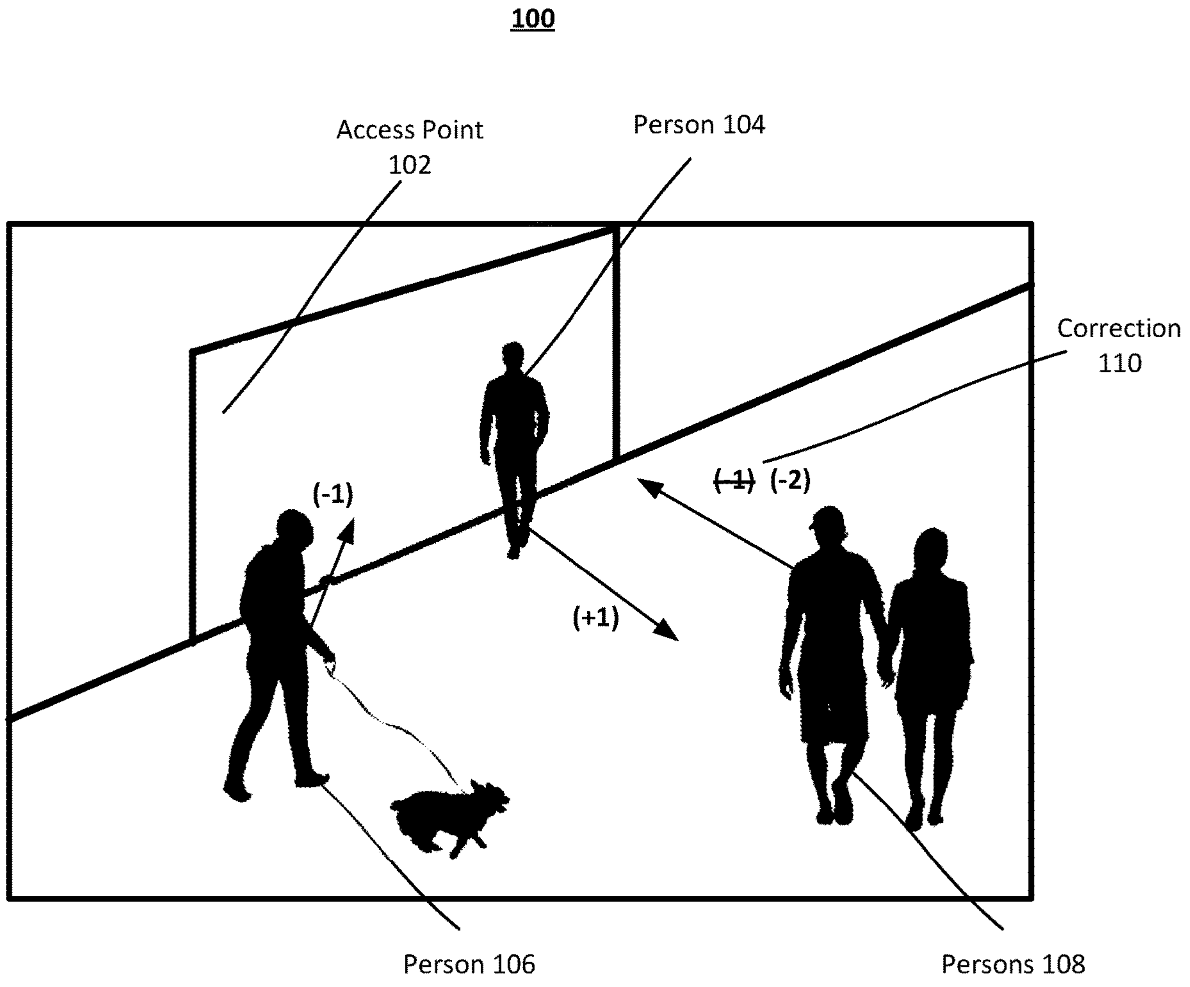
FIG. 1 is an example image frame captured by a camera used to detect objects in an environment, in accordance with exemplary aspects of the present disclosure.

FIG. 1 is an example image frame 100 captured by a camera used to detect objects in an environment, such as to monitor occupancy of an environment, in accordance with exemplary aspects of the present disclosure. The environment may be indoors or outdoors. Access point 102 may be a clear entry and exit point of the environment. For example, access point 102 is a door or a gate. Persons 104, 106, and 108 may enter and exit the environment. Their entry and exits may be captured by different sensors present in the environment. One sensor may be the camera that captured image frame 100. Other example sensors may be a depth sensor, a laser detector, an IR sensor, a video camera, etc. Using any combination of sensors and computer vision techniques (e.g. facial detection, segmentation, edge detection, object detection, etc.), an occupancy counting system may determine how many people have entered and exited the environment. For example, a visual boundary may be generated in the image frame. Depending on the trajectory of each detected person, the system may increment an entry/exit count.

Suppose that person 104 enters the environment. The occupancy counting system of the present disclosure may use a facial detection algorithm to identify person 104 at a certain position in a captured frame (e.g., frame 100). Over the course of multiple frames, the occupancy counting system may continue to detect person 104 and monitor the changes in position of person 104. Based on the facial features of person 104, the occupancy counting system may determine that the person in one frame is the same as the person in the next frame. In terms of tracking, a point on the face of person 104 may be located at position (x1, y1) in a first frame and may be located at position (x2, y2) in a second frame. The occupancy count system may determine that the difference between positions of a plurality of points where person 104 is tracked (including points (x1, y1) and (x2, y2)) is indicative of a trajectory of person 104. For example, a trajectory away from access point 102 may indicate an entry. A trajectory towards access point 102 may indicate an exit.

Figure 3:
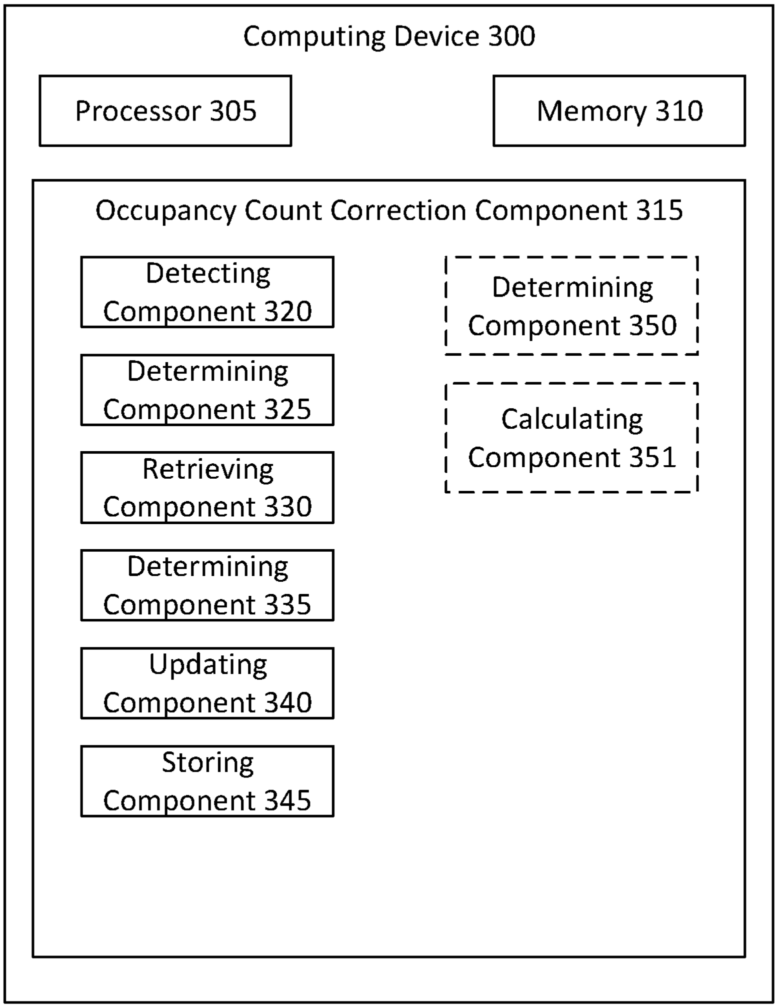
FIG. 3 is a block diagram of a computing device executing an occupancy count correction (OCC) component, in accordance with exemplary aspects of the present disclosure.

When person 104 enters the environment, the occupancy count may rise from 3 (including person 106 and persons 108) to 4. Suppose that person 106 then leaves the environment. The occupancy count may decrease back to 3. As previously explained, certain entries and exits may be missed. For example, persons 108 may exit, which should account for two exits. However, the camera may not detect two people because of their close proximity (e.g., one person may block the view of the camera as persons 108 exit). The occupancy count correction (OCC) component of an occupancy counting system described in FIG. 3 is configured to correct these issues. For example, the OCC component may make correction 110 based on a distribution of exits for a previous day. Thus, the exit count would be 2 (instead of 1) and the occupancy count would be 1 (instead of 2).

In some aspects, with this corrected information, the occupancy counting system may execute different commands depending on a goal set by an administrator. For example, if the administrator is seeking to limit the amount of entries to a maximum occupancy count, when the corrected occupancy count reaches the maximum occupancy count, the system may transmit an alert (e.g., generate and send an email or text message via a wired or wireless network) to the administrator or automatically prevent further entries (e.g., disable access point 102 access by activating a lock or deactivating entry motion detection if access point 102 are motion-detection-based). In other aspects, the administrator may seek to determine the amount of time people spend in the environment to determine an open/close schedule (e.g., close the store at 8:00 pm instead of 7:00 pm due to the high entry traffic at 6:45 pm).

The occupancy count at a given time is given by the difference in entry counts and exit counts. For example, if in a given time period five people enter and two people exit an environment, the occupancy count is the previous occupancy count plus the difference (i.e., the net entry/exit count). If the occupancy count was previously 0, the new occupancy count is three. Ideally, both the entry and exit counts are accurate. If even one of them is incorrect, the occupancy count is also incorrect.

As discussed previously, there are many reasons why the entry and exit counts may be incorrect. Occupancy counting solutions without a means for error correction will suffer from accumulated accuracy loss over time. The presented idea of real-time occupancy counting corrections using the described approach is unique. Observed typical prior approaches either utilize correlation with hardware devices or do not provide a real-time and active learning approach proposed by the present disclosure.

The use of statistical methods identifies the error in an occupancy or foot-traffic system's exit/entry count and corrects it in real-time. This probabilistic approach addresses the sensor noise/corrupted data challenge and potentially identifies malfunctioning devices. The proposed OCC component learns the distribution of the data, provides parameters, and as new data comes in, the model automatically corrects the system's exit/entry count—offering higher accuracy and solving the non-detection/undercounting problem.

In terms of exits, in some aspects, the beta-binomial regression algorithm is utilized by the OCC component. The beta distribution is a probability distribution that represents all the possible values of a probability when one does not know what that probability is. Consider a Missed Exit Percentage (MEP) as the predictor, given exit counts and entries counts. MEP is the percentage of missed exits (percentage between 0 and 1). The beta distribution is a perfect fit for this problem since it lies within this domain. The OCC component estimates separate priors for a given period of time (e.g., each day of the week). One useful approach to this is Bayesian hierarchical modeling.

In the event that the period of time is large (e.g., giving more consideration to the days with a higher percentage of missed exits), the OCC component utilizes the beta-binomial distribution. It should be noted that as more entries are detected, the higher the probability of missed exits (i.e., MEP). Thus, there is a relationship between the entries count and MEP.

In some aspects, each period of time (e.g., each day of the week) has its own prior associated with the beta-binomial regression model. This establishes a general framework for allowing a prior to depend on known information. Accordingly, the OCC component estimates hyperparameters $a_0$ (related to success) and $B_0$ (related to failures) for empirical Bayes. For each day, the OCC component updates the beta prior based on the evidence to get posterior parameters $a_1$ and $B_1$. The OCC component generates a data structure of historical ingress and egress data indicating date, entry counts, exit counts, MEP, an empirical Bayes Estimate that lists an estimate about MEP for each time unit (e.g., day) in the period of time (estimated from a combination of each time unit's record with the beta prior parameters estimated across all time units ($a_0$, $B_0$)), $a_1$, and $B_1$.

To avoid under estimation in exit counts the OCC component accounts for entries in the model (as entries influence priors and particularly affect the MEP). In particular, the typical MEP is to be linearly affected by log(Entries). Defining $p_i$ to be the true probability of exits for a time unit (i.e., "true MEP"), the OCC component runs based on the following:

$p_i$~Binom($a_0$, $B_0$)

$E_i$~Beta(Entries$_i$, $p_i$), wherein Entries$_i$ is fixed and known per time unit.

The OCC component first fits these prior parameters: $\mu_0$, $\mu_{Entries}$, $\sigma_0$. The OCC component momentarily "forgets" Bayes and picks $a_0$ and $B_0$ using a maximum likelihood. The OCC component then fits beta-binomial regression using the maximum likelihood to obtain $\mu_0$, $\mu_{Entries}$, $\sigma_0$ (establishing the dependency of the prior beta distribution for a time unit on the value of the entry count). The OCC component then repeats the second step of the empirical Bayes method. Instead of using a single $a_0$ and $B_0$ values as the prior, however, the OCC component chooses the prior for each time unit (e.g., day) based on their entry counts. For example, there may be different $a_0$ and $B_0$ values for Monday than there may be for Tuesday. The OCC component then updates using their E and Entries and calculates $\mu=\mu_0+\mu_{log\,(Entries)}$ and $\sigma$ parameters for each person. In some aspects, $\sigma$ will be the same for every time unit (but that may not be true in more complex models).

The OCC component then calculates $a_0$ and $B_0$ parameters for each time unit, according to $a_{0,i}=\mu_0/\sigma_0$ and $B_{0,i}=(1-\mu_i)/\sigma_0$. From this, the OCC component updates E and Entries to calculate the new $a_{1,i}$ and $B_{1,i}$ for each time unit. Lastly, the OCC component calculates an exit ratio based on the time unit in a period of time (e.g., a day in a week), and multiplies the exit ratio with the detected exit count to get a corrected exit count. For example, if the detected exit count is 10 and the exit ratio is 1.2, the corrected exit count becomes 12.

Thus far, the focus has been on counting exits correctly. In terms of counting entries correctly, a different approach is used (because entries are mostly independent of prior exits and other entries). One issue with entry detection is that occupancy counting systems detect multiple "zero" entries. Consider the following dataset:

TABLE 1

| Day | Hour | Entry Count | Exit |
|---|---|---|---|
| 2021 Mar. 23 | 14:00 | 173 | 99 |
| 2021 Apr. 28 | 20:00 | 262 | 235 |
| 2021 May 1 | 12:00 | 0 | 0 |
| 2021 May 1 | 23:00 | 0 | 0 |
| . . . | . . . | . . . | . . . |
| 2021 May 9 | 2:00 | 28 | 29 |

As can be seen in the table, at 23:00, there are zero entries. This seems like a realistic count because the environment may be a store that is closed at that time. However, the table also indicates that at noon, there were zero entries. This needs correction. Suppose that the table has a total of 3024 entries and 412 of those entries indicate zero as the entry count. Of these zeroes, only 10 are true zeroes (e.g., zeroes where the store was closed). The OCC component utilizes a probability mass function of the Zero-Inflated Poisson model to determine the correct entry count.

First, the OCC component calculates $\varphi_i$ using logistic regression as the ratio of zeros for the ith row in the dataset above. For example, of the 412 zero entries, 10 are true zeroes-thus 402 are potentially not true zeroes. This gives a $\varphi_i$ value of 402/3024=0.133.

When the entry count is zero, the OCC component calculates $P(yi=0)=\varphi_i+(1-\varphi_i)*e^{-\lambda i}$ and when the entry count is not zero, the OCC component calculates $$P(yi=K)=(1-\varphi_i)*\frac{e^{-\lambda i}*\lambda_i^k}{k!},$$

where $\lambda_i=e^{x_i\beta}$ where $x_i$ is a regression variable in the ith row and $\beta$ is a vector of regression coefficients (regular poisson). Here, P represents the true entry count value.

It should be noted that when estimating either exit counts or entry counts, detection models have more errors when larger groups of people are present. In some aspects, the algorithms executed by OCC component may be adjusted to account for group size. For example, the OCC component may use the correction algorithm involving the probability distributions particularly for time periods where the group size is greater than a threshold size. In another example, the OCC component may detect image frames where more than a threshold number of people are detected. The OCC component may store the time period associated with the image frames and run the correction algorithm for the stored time period.

Figure 2:
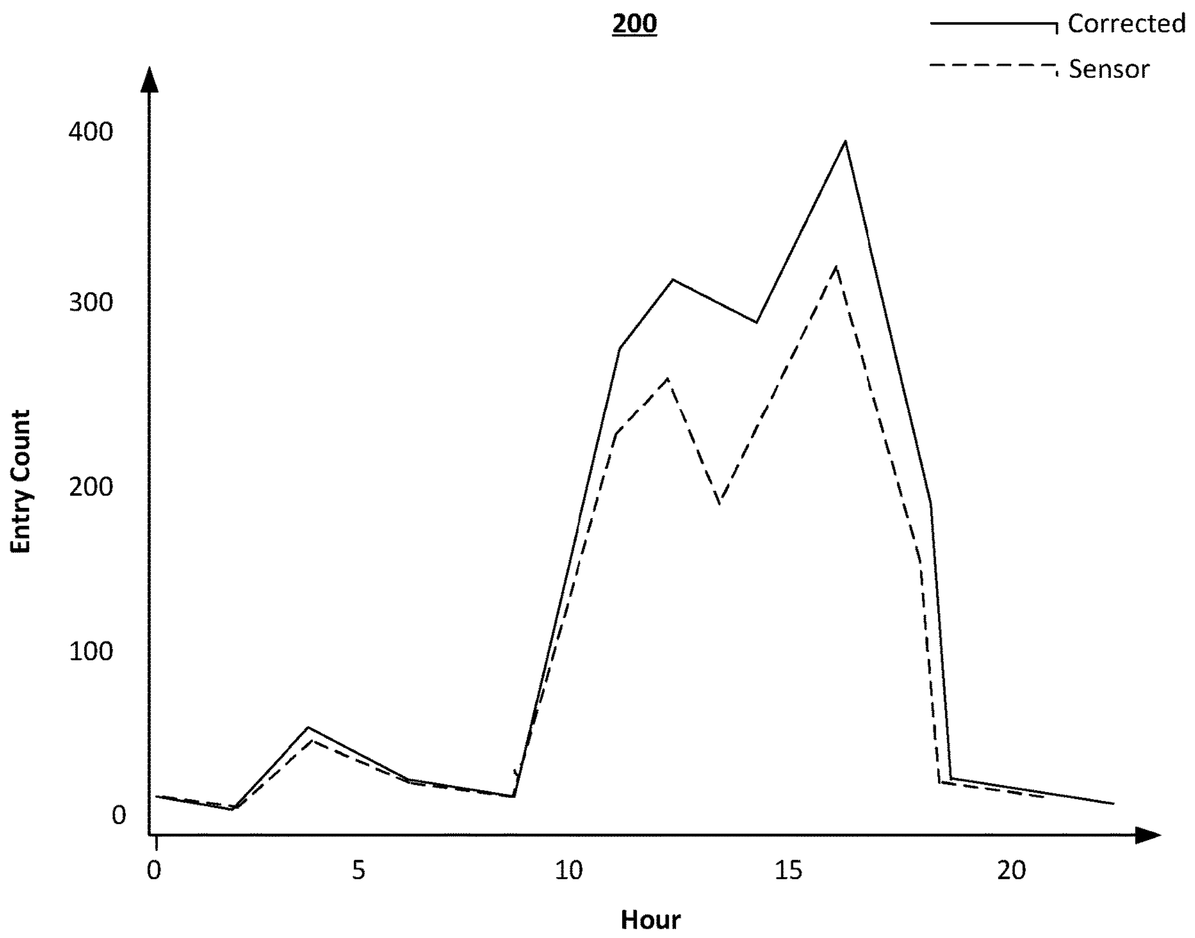
FIG. 2 is a diagram depicting occupancy count correction, in accordance with exemplary aspects of the present disclosure.

FIG. 2 is a diagram depicting occupancy count correction, in accordance with exemplary aspects of the present disclosure. FIG. 2 depicts how fitting the entry counts to a probability distribution can help achieve the real entry count values. For example, using the sensor approach (dashed line) described in FIG. 1, the entry counts are undercounted relative to the corrected counts (solid line). It should be noted that this undercounting is also present in exit counting.

Figure 4:
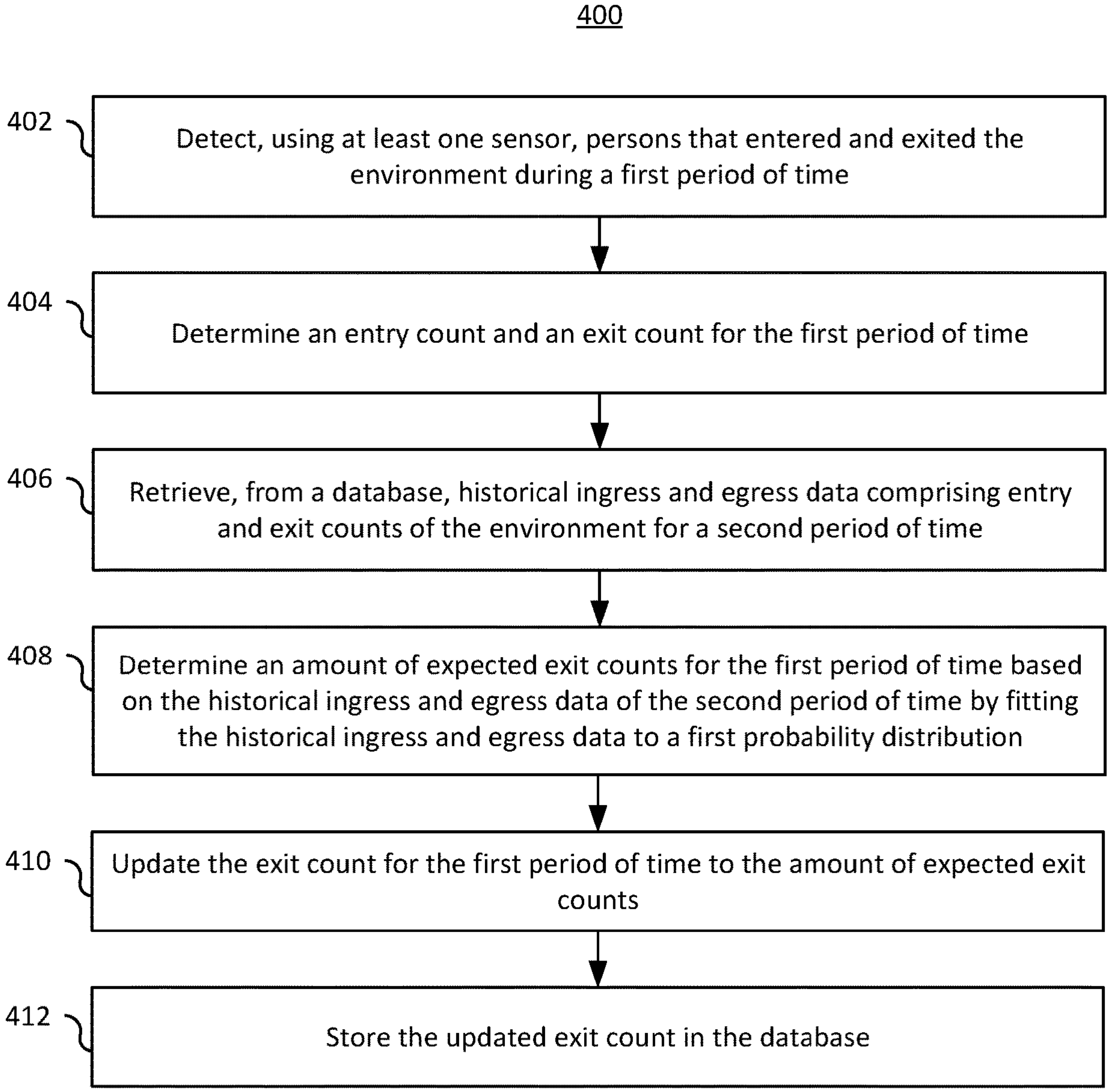
FIG. 4 is a flowchart illustrating a method of detecting objects in an environment, in accordance with exemplary aspects of the present disclosure.

FIG. 3 is a block diagram of computing device 300 executing an occupancy count correction (OCC) component 315, in accordance with exemplary aspects of the present disclosure. FIG. 4 is a flowchart illustrating method 400 of detecting objects in an environment, in accordance with exemplary aspects of the present disclosure. Referring to FIG. 3 and FIG. 4, in operation, computing device 300 may perform method 400 of correcting exit count in an environment via execution of OCC component 315 by processor 305 and/or memory 310.

At block 402, the method 400 includes detecting, using at least one sensor, persons that entered and exited the environment during a first period of time. For example, in an aspect, computer device 300, processor 305, memory 310, OCC component 315, and/or detecting component 320 may be configured to or may comprise means for detecting, using the camera that captured the image in FIG. 1, persons (e.g., persons 104, 106, and 108) that entered and exited the environment (e.g., a store) during a first period of time (e.g., Monday between 10:00 am and 12:00 pm).

For example, detecting component 320 may use facial recognition and tracking algorithms to detect and monitor persons 104, 106, and 108 over a plurality of image frames.

At block 404, the method 400 includes determining an entry count and an exit count for the first period of time. For example, in an aspect, computer device 300, processor 305, memory 310, OCC component 315, and/or determining component 325 may be configured to or may comprise means for determining an entry count (e.g., 4) and an exit count (e.g., 2) for the first period of time.

For example, in FIG. 1, four persons are shown inside the environment. Suppose that they all entered via access point 102 between 10:00 am and 12:00 pm. Person 106 and persons 108 may be exiting. Although this should mean that three people have left the environment, the detection algorithm may miss one of persons 108.

At block 406, the method 400 includes retrieving, from a database, historical ingress and egress data comprising entry and exit counts of the environment for a second period of time. For example, in an aspect, computer device 300, processor 305, memory 310, OCC component 315, and/or retrieving component 330 may be configured to or may comprise means for retrieving, from a database (e.g., in memory 310), historical ingress and egress data comprising entry and exit counts of the environment for a second period of time.

In some aspects, OCC component 315 may generate a data structure of historical ingress and egress data indicating date, entry counts, exit counts, MEP, an empirical Bayes Estimate that lists an estimate about MEP for each time unit (e.g., day) in the period of time (estimated from a combination of each time unit's record with the beta prior parameters estimated across all time units ($a_0$, $B_0$)), $a_1$, and $B_1$. In particular, OCC component 315 updates the beta prior based on the evidence to get posterior parameters $a_1$ and $B_1$.

In some aspects, the first period of time and the second period of time are at a same time of day across different days. For example, the second period of time may be Sunday between 10:00 am and 12:00 pm. In some aspects, the different days are a same day across different weeks. For example, the second period of time may be Monday from the previous week between 10:00 am and 12:00 pm.

At block 408, the method 400 includes determining an amount of expected exit counts for the first period of time based on the historical ingress and egress data of the second period of time by fitting the historical ingress and egress data to a first probability distribution. For example, in an aspect, computer device 300, processor 305, memory 310, OCC component 315, and/or determining component 335 may be configured to or may comprise means for determining an amount of expected exit counts for the first period of time (e.g., 12 exits) based on the historical ingress and egress data of the second period of time by fitting the historical ingress and egress data to a first probability distribution. In some aspects, the first probability distribution is a Beta-Binomial distribution.

In an exemplary aspect, OCC component 315 accounts for entries in the model (as entries influence priors and particularly affect the MEP). In particular, the typical MEP is to be linearly affected by log(Entries). Defining $p_i$ to be the true probability of exits for a time unit (i.e., "true MEP"), OCC 315 component runs based on the following:

$p_i$~Binom($a_0$, $B_0$)

$E_i$~Beta(Entries$_i$, $p_i$), wherein Entries$_i$ is fixed and known per time unit.

OCC component 315 estimates hyperparameters $a_0$ and $B_0$ for empirical Bayes using a maximum likelihood. OCC component 315 then fits beta-binomial regression using the maximum likelihood to obtain $\mu_0$, $\mu_{Entries}$, $\sigma_0$. OCC component 315 then repeats the second step of the empirical Bayes method. OCC component 315 then updates using the E and Entries values and calculates $u=\mu_0+\mu_{log(Entries)}$ and σ parameters for each person.

OCC component 315 then calculates $a_0$ and $B_0$ parameters for each time unit, according to $a_{0,i}=\mu_i/\sigma_0$ and $B_{0,i}=(1-\mu_i)/\sigma_0$. From this, OCC component 315 updates E and Entries to calculate the new $a_{1,i}$ and $B_{1,i}$ for each time unit. Lastly, OCC component 315 calculates an exit ratio based on the time unit in a period of time (e.g., a day in a week), and multiplies the exit ratio with the detected exit count to get a corrected exit count. For example, if the detected exit count is 10 and the exit ratio is 1.2, the corrected exit count becomes 12.

An example of exit miss probabilities is shown in the table below:

TABLE 2

| Day | Hour | Entry Count | Exit | Exit Miss Probability |
|---|---|---|---|---|
| 2021 Mar. 23 | 14:00 | 173 | 99 | 0.02 |
| 2021 Apr. 28 | 20:00 | 262 | 235 | 0.03 |
| 2021 May 1 | 12:00 | 0 | 0 | 0.02 |
| 2021 May 1 | 23:00 | 0 | 0 | 0.02 |
| . . . | . . . | . . . | . . . | . . . |
| 2021 May 9 | 2:00 | 28 | 29 | 0.02 |

At block 410, the method 400 includes updating the exit count for the first period of time to the amount of expected exit counts. For example, in an aspect, computer device 300, processor 305, memory 310, OCC component 315, and/or updating component 340 may be configured to or may comprise means for updating the exit count for the first period of time to the amount of expected exit counts. For example, the exit count for the first period of time may be 10 and the amount of expected exit counts may be 12.

At block 412, the method 400 includes storing the updated exit count in the database. For example, in an aspect, computer device 300, processor 305, memory 310, OCC component 315, and/or storing component 345 may be configured to or may comprise means for storing the updated exit count in the database (e.g., in memory 310). For example, instead of recording 10 exits, the updated count of 12 exits is recorded in the database. In some aspects, the stored count is included in the historical ingress and egress data.

Figure 5:
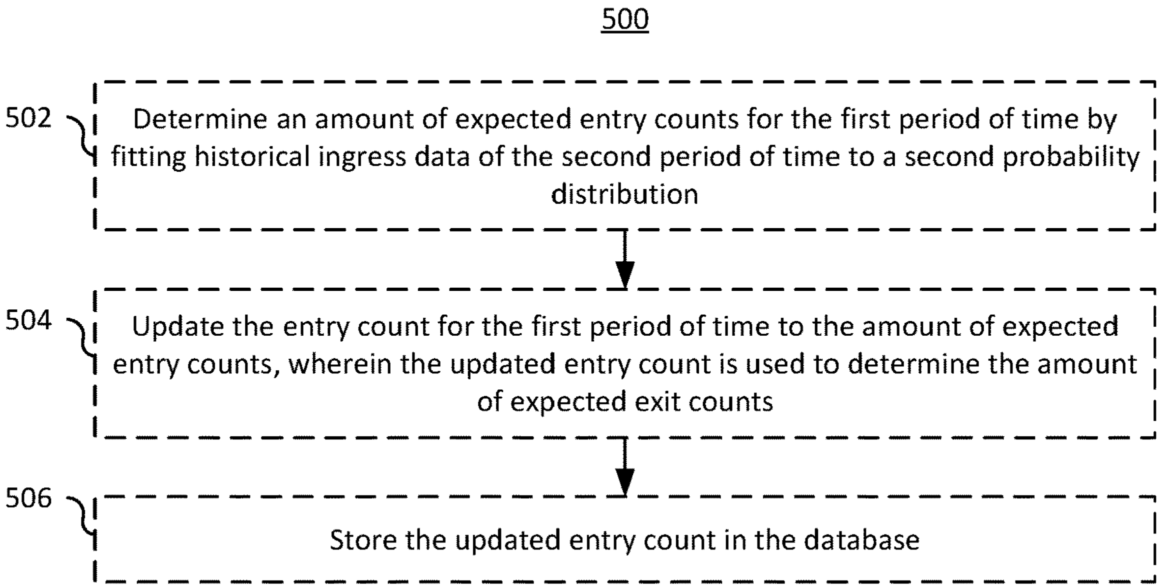
FIG. 5 is a flowchart illustrating a method of detecting objects in an environment, in accordance with exemplary aspects of the present disclosure.

FIG. 5 is a flowchart illustrating method 500 of detecting objects in an environment, in accordance with exemplary aspects of the present disclosure.

At block 502, the method 400 includes determining an amount of expected entry counts for the first period of time by fitting historical ingress data of the second period of time to a second probability distribution. For example, in an aspect, computer device 300, processor 305, memory 310, OCC component 315, and/or determining component 350 may be configured to or may comprise means for determining an amount of expected entry counts for the first period of time by fitting historical ingress data of the second period of time to a second probability distribution (e.g., the Poisson distribution).

Referring again to table 1, which may represent historical ingress data of the second period of time, OCC component 315 may calculate $\varphi_i$ using logistic regression as the ratio of zeros for the ith row in table 1. For example, of 412 zero entries, 10 are true zeroes, and 402 are potentially not true zeroes. This gives a $\varphi_i$ value of 402/3024=0.133. Suppose that the detected entry count for the first period of time is 20. In this case, OCC component 315 may calculate $$P(yi=K)=(1-\varphi_i)*\frac{e^{-\lambda i}*\lambda_i^k}{k!},$$

where $\lambda_i=e^{x_i\beta}$ and where $x_i$ is a regression variable in the ith row and $\beta$ is a vector of regression coefficients (regular poisson). Here, P represents the amount of expected entry counts.

After performing the calculation, the amount of expected entry counts may be 25 instead of 20.

At block 504, the method 400 includes updating the entry count for the first period of time to the amount of expected entry counts, wherein the updated entry count is used to determine the amount of expected exit counts. For example, in an aspect, computer device 300, processor 305, memory 310, OCC component 315, and/or updating component 340 may be configured to or may comprise means for updating the entry count for the first period of time to the amount of expected entry counts.

As mentioned above, the amount of expected exit counts may be used to calculate the updated entry count. For example, suppose that the detected entry count is 20 and the detected exit count is 10 for the first period of time. After the entry count is updated to 25, the number of exit counts is also likely to change. Referring to the calculation in FIG. 4, the entry values used are no longer the detected entry counts, but instead are the amount of expected entry counts.

At block 506, the method 400 includes storing the updated entry count in the database. For example, in an aspect, computer device 300, processor 305, memory 310, OCC component 315, and/or storing component 345 may be configured to or may comprise means for storing the updated entry count in the database.

Figure 6:
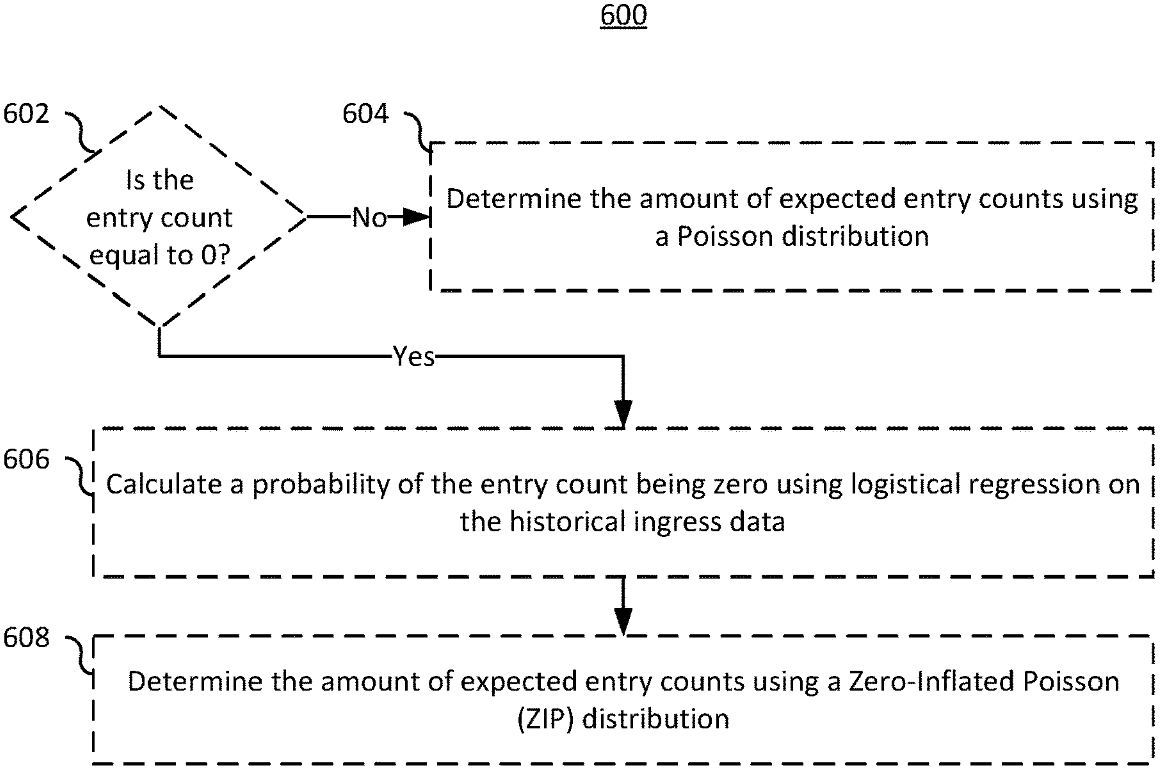
FIG. 6 is a flowchart illustrating a method of detecting objects in an environment depending on whether the entry count is zero, in accordance with exemplary aspects of the present disclosure.

FIG. 6 is a flowchart illustrating method 600 of detecting objects in an environment depending on whether the entry count is zero, in accordance with exemplary aspects of the present disclosure.

At block 602, the method 400 includes determining whether the entry count is zero. For example, in an aspect, computer device 300, processor 305, memory 310, OCC component 315, and/or determining component 325 may be configured to or may comprise means for determining whether the entry count is zero.

If the entry count is not equal to zero, method 600 advances to 604. Otherwise, method 600 advances to 606.

At block 604, the method 400 includes determining the amount of expected entry counts using a Poisson distribution (as explained in FIG. 5). For example, in an aspect, computer device 300, processor 305, memory 310, OCC component 315, and/or determining component 350 may be configured to or may comprise means for determining the amount of expected entry counts using a Poisson distribution.

At block 606, the method 400 includes calculating a probability of the entry count being zero using logistical regression on the historical ingress data. For example, in an aspect, computer device 300, processor 305, memory 310, OCC component 315, and/or calculating component 351 may be configured to or may comprise means for calculating a probability of the entry count being zero using logistical regression on the historical ingress data.

At block 608, the method 400 includes determining the amount of expected entry counts using a Zero-Inflated Poisson (ZIP) distribution. For example, in an aspect, computer device 300, processor 305, memory 310, OCC component 315, and/or determining component 350 may be configured to or may comprise means for determining the amount of expected entry counts using a Zero-Inflated Poisson (ZIP) distribution.

For example, when the entry count is zero, OCC component 315 calculates $P(yi=0)=\varphi_i+(1-\varphi_i)*e^{-\lambda i}$, where $\lambda_i=e^{x_i\beta}$ where $x_i$ is a regression variable in the ith row and $\beta$ is a vector of regression coefficients (regular poisson). Here, P represents the amount of expected entry counts.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A vision system for detecting objects in an environment, comprising:

at least one sensor;

a memory; and a processor communicatively coupled with the memory and the at least one sensor and configured to:

detect, using the at least one sensor, persons that entered and exited the environment during a first period of time;

determine an entry count and an exit count for the first period of time;

retrieve, for a second period of time from a database, historical ingress and egress data comprising historic entry and exit counts of the environment and a missed exit percentage (MEP) indicating a percentage of exits missed in the historic entry and exit counts, wherein the first period of time and the second period of time are at a same time of day across different days;

fit the historical ingress and egress data to a first probability distribution to determine an exit ratio;

update the exit count for the first period of time to an amount of expected exit counts by multiplying the exit ratio with the exit count; and store the updated exit count in the database.

2. The vision system of claim 1, wherein the historical ingress and egress data further comprises additional historical entry and exit counts for a plurality of time periods, wherein the processor is further configured to:

determine an amount of entries in the historical ingress and egress data where a respective entry count is zero;

calculate a ratio of the amount of entries and a total entry count across the plurality of time periods;

in response to determining that the entry count is not zero, apply a second probability distribution to the ratio and the entry count to determine an amount of expected exit counts;

update the entry count for the first period of time to the amount of expected entry counts; and store the updated entry count in the database.

3. The vision system of claim 2, wherein the second probability distribution is a Poisson distribution.

4. The vision system of claim 3, wherein the processor is configured to determine the amount of expected entry counts by:

in response to determining that the entry count is zero, determining the amount of expected entry counts using a Zero-Inflated Poisson (ZIP) distribution.

5. The vision system of claim 1, wherein the first probability distribution is a Beta-Binomial distribution.

6. The vision system of claim 1, wherein the different days are a same day across different weeks.

7. The vision system of claim 2, wherein the processor is further configured to in response to detecting that the updated entry count meets a maximum occupancy count:

transmit an alert to an administrator; or automatically prevent further entries.

8. A method for use by a vision system for detecting objects in an environment, comprising:

detecting, using at least one sensor, persons that entered and exited the environment during a first period of time;

determining, by a processor, an entry count and an exit count for the first period of time;

retrieving, for a second period of time from a database by the processor, historical ingress and egress data comprising historic entry and exit counts of the environment and a missed exit percentage (MEP) indicating a percentage of exits missed in the historic entry and exit counts, wherein the first period of time and the second period of time are at a same time of day across different days for a second period of time;

fitting, by the processor, the historical ingress and egress data to a first probability distribution to determine an exit ratio;

updating, by the processor, the exit count for the first period of time to an amount of expected exit counts by multiplying the exit ratio with the exit count; and storing, by the processor, the updated exit count in the database.

9. The method of claim 8, wherein the historical ingress and egress data further comprises additional historical entry and exit counts for a plurality of time periods, further comprising:

determining, by the processor, an amount of entries in the historical ingress and egress data where a respective entry count is zero;

calculating, by the processor, a ratio of the amount of entries and a total entry count across the plurality of time periods;

in response to determining that the entry count is not zero, applying, by the processor, a second probability distribution to the ratio and the entry count to determine an amount of expected exit counts;

updating, by the processor, the entry count for the first period of time to the amount of expected entry counts; and storing, by the processor, the updated entry count in the database.

10. The method of claim 9, wherein the second probability distribution is a Poisson distribution.

11. The method of claim 10, wherein determining the amount of expected entry counts further comprises:

in response to determining, by the processor, that the entry count is zero, determining, by the processor, the amount of expected entry counts using a Zero-Inflated Poisson (ZIP) distribution.

12. The method of claim 8, wherein the first probability distribution is a Beta-Binomial distribution.

13. The method of claim 8, wherein the different days are a same day across different weeks.

14. The method of claim 9, further comprising in response to detecting that the updated entry count meets a maximum occupancy count:

transmitting an alert; or automatically preventing further entries.

15. A non-transitory computer-readable medium storing instructions, for use by a vision system for detecting objects in an environment, executable by a processor to perform a method for use by a vision system for detecting objects in an environment, comprising:

detecting, using at least one sensor, persons that entered and exited the environment during a first period of time;

determining an entry count and an exit count for the first period of time;

retrieving, for a second period of time from a database, historical ingress and egress data comprising historic entry and exit counts of the environment and a missed exit percentage (MEP) indicating a percentage of exits missed in the historic entry and exit counts;

fitting the historical ingress and egress data to a first probability distribution to determine an exit ratio;

updating the exit count for the first period of time to an amount of expected exit counts by multiplying the exit ratio with the exit count; and storing the updated exit count in the database.

16. The non-transitory computer-readable medium of claim 15, wherein the historical ingress and egress data further comprises additional historical entry and exit counts for a plurality of time periods, further comprising instructions for:

determining, by the processor, an amount of entries in the historical ingress and egress data where a respective entry count is zero;

calculating, by the processor, a ratio of the amount of entries and a total entry count across the plurality of time periods;

in response to determining that the entry count is not zero, applying, by the processor, a second probability distribution to the ratio and the entry count to determine an amount of expected exit counts;

updating, by the processor, the entry count for the first period of time to the amount of expected entry counts; and storing, by the processor, the updated entry count in the database.

17. The non-transitory computer-readable medium of claim 16, wherein the second probability distribution is a Poisson distribution.

18. The non-transitory computer-readable medium of claim 17, wherein an instruction for determining the amount of expected entry counts further comprises instructions for:

in response to determining, by the processor, that the entry count is zero, determining, by the processor, the amount of expected entry counts using a Zero-Inflated Poisson (ZIP) distribution.

* * * * *